United States Patent [19]

Neuzil

[11] 3,734,974
[45] May 22, 1973

[54] HYDROCARBON SEPARATION PROCESS
[75] Inventor: Richard W. Neuzil, Downers Grove, Ill.
[75] Assignee: Universal Oil Products Company, Des Plaines, Ill.
[22] Filed: July 26, 1971
[21] Appl. No.: 165,101

[52] U.S. Cl.............................260/674 SA, 208/310
[51] Int. Cl...........................C07c 7/12, C10g 25/04
[58] Field of Search..................260/674 SA; 208/310

[56] References Cited
UNITED STATES PATENTS 3,626,020  12/1971  Neuzil..................................260/674
3,524,895  8/1970   Chen et al............................208/310

Primary Examiner—Delbert E. Gantz
Assistant Examiner—C. E. Spresser
Attorney—James R. Hoatson, Jr. and Robert W. Erickson

[57] ABSTRACT

This application broadly discloses a process for the separation of para-aromatics isomer from a feed mixture containing para- and at least one other aromatic isomer. The process utilizes a crystalline aluminosilicate adsorbent containing barium cations base-exchanged upon the zeolite. The zeolite also contains a pre-determined quantity of water upon the adsorbent. The process can be performed in batch fixed-bed processes, moving bed processing sequences or fixed-bed simulated moving bed countercurrent flow process. Separation takes place in either liquid or vapor operations using isothermal, isobaric or both operating conditions.

The specific disclosure of this application relates to the use of a particular adsorbent to separate para-xylene from xylene mixtures which adsorbent is of a type X or type Y crystalline structured aluminosilicate containing barium cations and water within the zeolite.

8 Claims, 1 Drawing Figure

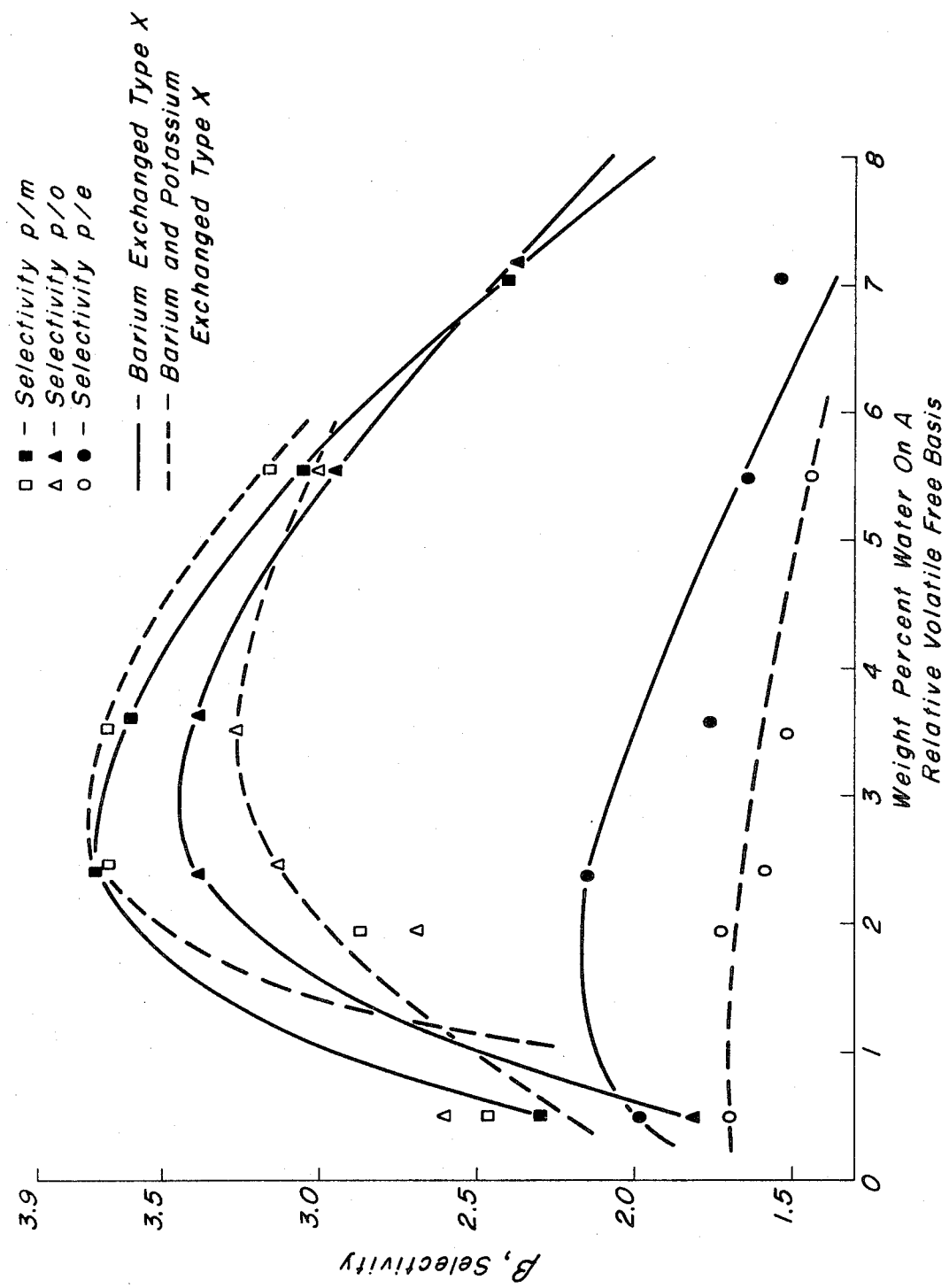

HYDROCARBON SEPARATION PROCESS

BACKGROUND OF THE INVENTION

1. Field of the Invention

The field of art to which this invention pertains is hydrocarbon separation. More specifically, this application relates to the hydrocarbon separation art utilizing crystalline aluminosilicate to selectively adsorb and separate aromatic isomer mixtures.

2. Description of the Prior Art

Prior art exists relating to the use of type X or type Y zeolites to separate xylenes, particularly paraxylene from xylene feed mixtures. Particularly, there is prior art existing which discloses the use of particular cations on type X or type Y zeolites to selectively adsorb the particular xylene component. There is also art existing which discloses the use of the combination of barium and potassium, both base-exchanged upon a type X or type Y structured crystalline aluminosilicate, to render a sieve which is selective towards para-xylene with respect to all other xylene isomers including ethylbenzene. It appears that the barium and potassium perform complimentary functions with one another rendering a sieve which possesses synergistic qualities as compared to a sieve used to separate xylene isomers using either barium by itself or potassium by itself.

The prior art however has not recognized the use of water to selectively alter the selectivity of a zeolite for para-isomers as compared to the other isomers. Water has been known to modify the rates at which molecules pass into and out of a zeolite and in particular water has been claimed and utilized in separating processes in which the 4 Angstrom or 5 Angstrom zeolite sieves have been used to separate normal paraffins from iso-paraffins. Water however has not been disclosed or suggested by any of the prior art relating to both xylene separation and normal and iso-paraffin separation to modify the selectivity of an adsorbent for a particular feed component. In particular, water is placed upon a crystalline aluminosilicate in an optimum range to maximize the selectivity of that adsorbent for the para-isomer. I have found that water can be placed upon a crystalline aluminosilicate which contains barium cations to modify the selectivity of a sieve in a manner similar to the effects which are achieved when using potassium and barium upon the zeolite. In other words, the water placed upon the zeolite appears to effectively reproduce the results which can be achieved when potassium is placed upon the zeolite. The theory proposed for the effects of water on the zeolite is not known.

SUMMARY OF THE INVENTION

The invention claimed herein can be briefly summarized as a separation process for selective separation of para-isomers from a feed mixture containing isomers utilizing a type X or type Y structured crystalline aluminosilicate containing thereon barium cations and a given quantity of water located within the zeolite. The preferred quantity of water present upon the zeolite should be within the range of from about 1 to about 8 weight percent of the zeolite as measured on a relative volatile-free basis. The process of this invention effects the separation of the para-isomer by the selective adsorption of that isomer from the feed mixture containing other isomers. The para-isomer is recovered from the adsorbent in a subsequent desorption step.

DETAILED DESCRIPTION OF THE INVENTION

Feed stocks which can be used in the process of this invention include the xylene isomers — namely, para-xylene, meta-xylene, ortho-xylene and ethylbenzene. These four hydrocarbon types are considered to fall within generic term of xylene isomers for the purposes of this specification. Other aromatics may be included as feed stocks, such as diethylbenzenes or cymenes.

Feed stocks can be derived from many areas within petrochemical or petroleum processing plants. Specifically, xylene can be derived from treated reformate streams which contain relatively high concentrations of xylene isomers. The feed stocks which can be used in the process of this invention also include minor constituents of paraffins or olefins or other aromatic hydrocarbons. It is preferable however to reduce the quantity of non-xylene materials passed as feed into the process of this invention in order to prevent damage to the adsorbent from reactive feed components and to prevent the reduction of the selectivity of the adsorbent for the xylenes. In many instances, the presence of other type hydrocarbon compounds severely restricts the maximum attainable selectivity to an extent which renders the adsorbent almost totally unselective with respect to any feed stock component.

Specific feed streams which can be used in the process of this invention contain at least two components selected in the group of ortho, meta, para-xylene and ethylbenzene with possible inclusions of portions of straight and branched chain paraffins, cyclo-paraffins and aromatics including benzene, toluene, naphthalenes, etc. It is preferable however to utilize feed streams having a $C_8$ aromatic isomer concentration of from about 80 up to about 100 vol.% of the total feed contacting the adsorbent bed. Sources from which $C_8$ aromatic feed can be obtained include such processes as xylene isomerization units or reformers.

Additionally other feed stocks such as the cymenes, the diethylbenzenes or any other single range aromatic hydrocarbon which can be broken down into an isomerization characterization in which ortho, meta and para-isomers can be readily distinguished. Specifically included in this list are the ortho, meta and para-diethylbenzenes along with butylbenzene, and the ortho-, meta- and para-cymene isomers along with butyl benzene, etc.

Desorbents which can be used in the process of this invention can vary depending upon the feed stock or the particular processing sequence utilized in the process. Specifically when using a relatively constant temperature process in liquid or vapor phase it is possible to use other aromatic desorbents such as benzene or toluene or higher aromatic hydrocarbons such as the $C_8$ aromatics or the diethylbenzenes. Other desorbent materials can be utilized such as paraffins, cycloparaffins, olefins or chlorinated or sulfonated hydrocarbons in a manner to effectively desorb the selectively adsorbed para isomer from the adsorbent. The desorbent must be easily separated from the para- isomer to render high product purity. Specifically a mixture of desorbent and the para- isomer should be easily separated by being passed into a fractionating column and separated into relatively pure desorbent and para- isomer product streams. In other instances which desorption takes place using increased temperatures and/or vacuum techniques, gaseous materials such as air, oxygen, nitrogen, light hydrocarbons and the like can be utilized to purge para-isomer from the adsorptive sites of the adsorbent. In instances in which high temperature and/or vacuum purging steps are utilized, it may be not necessary to utilize a stripping medium but the combination of high temperature and vacuum conditions may be enough to completely purge the para-isomer from the adsorbent.

The selectively adsorbed component is commonly referred to as the extract component of the feed stock and for purposes of this specification is referred to as the para- isomer since that isomer is selectively adsorbed when utilizing adsorbent described herein. In some instances there may be two or more para- isomers adsorbed by the adsorbent such as in cases where there are mixtures of different molecular weight feed stocks. The raffinate materials are typically the non-selectively adsorbed feed components, in instances in which the para-xylene is present along with meta-xylene, ethylbenzene and ortho-xylene, the latter three isomers are considered to be raffinate materials. The raffinate materials are generally described as what remains within the non-selective pore volume of the adsorbent particles after the para- isomer has been selectively adsorbed from the feed stock by the adsorbent.

Desorbent materials are generally defined as those materials which are capable of displacing para-isomers from the adsorbent to allow the recovery of the para-isomer. It is preferable that desorbent material also be easily displaced by para-isomers or else once a sieve had been contacted by para-isomers and then desorbent material the adsorbent would thereafter be useless as there would be no more available selective pore volume within the adsorbent to take on additional, para-isomer in a subsequent adsorption step.

Adsorption conditions include temperatures within the range of from about ambient temperatures up to about 450°F. or higher. Pressures can range anywhere from around atmospheric up to 1,000 psig or higher. It is preferable however, to utilize pressures in a relatively low range, that is, within the range of from about 20 to about 200 psig. to reduce the equipment cost in commercial installations. Temperatures should be high enough temperatures so that feed and desorbent materials can pass into and out of the selective adsorptive sites of the adsorbent without undue delay. The adsorption conditions can also include either liquid or vapor phase operations which can be achieved by regulation of pressures and temperatures to maintain the given phase which is desired.

Desorption conditions can include the temperature and pressure limitations described for the adsorption conditions. Additionally desorption conditions can include varying temperatures and pressures along with the passage of a purge stream through the adsorbent to help remove para- isomers from the adsorbent.

The flow schemes which can be utilized to effect the process of this invention include batch-type fixed bed processes, the continuous simulated moving-bed systems and the moving bed systems. Specifically, the process flow schemes can include systems in which a multiple of adsorbent chambers are utilized in sequence with alternate passage of feed desorbent materials through the individual chambers to allow a relatively continuous production of extract material. Preferable processing flow schemes which can be utilized to effect the process of this invention include what is known in the art as the simulated moving-bed systems. These systems include flow schemes similar to that described in U.S. Pat. No. 2,985,589, issued to D. B. Broughton. This patent generally describes the processing sequences involved in simulated moving-bed solid-fluid contacting process. In fact, the process generally described in that patent are the preferred modes of operating the separation process disclosed herein.

Throughout this specification and unless otherwise noted the percentage analysis of the adsorbent zeolite shall be on what is generally referred to in the art as "relative volatile free basis." The chemical composition of the zeolite on a relative volatile free basis is determined after the zeolite has been contacted in a muffle furnace at temperatures of about 500°C. to a time sufficient to allow the zeolite to reach a constant weight. After the zeolite has reached constant weight (the volatile material having been driven off) it is placed in a desiccator and allowed to reach room temperature after which it is analyzed to determine its chemical composition. All of the chemical analysis referred to herein are determined on the basis of the constant weight sample being 100 percent. In determining a water content of an adsorbent on a relative volatile free basis, it is presumed that in any zeolite which contains binder that the water is dispersed between the binder and the zeolite in proportion to their respective weight ratios. The chemical analysis of a zeolite generally include the binder material as part of the chemical analysis. In instances in which the binder material is used (generally with type X structured zeolites) it is presumed that approximately 20 wt.% on a volatile free basis of the total adsorbent material utilized is a binder material. The binders generally are comprised of clay-structured amorphous type materials such as silica and alumina mixtures.

When measuring the water content of a zeolite on a relative volatile free basis, the sieve is dried using a muffle furnace at any desired temperature to drive a certain percentage of volatile materials. After a certain period of time the only material being driven off is water. The drying procedure is stopped short of the condition when the adsorbent contains no water. The adsorbent is removed from the furnace and placed in a desiccator to obtain room temperature and then sampled. The material not sampled is then utilized in a testing apparatus to determine the selectivity of the particular adsorbent for para-isomers as compared to other isomers. The sample of the adsorbent not utilized in the separation testing is thereafter weighed and then subjected to a 500° temperature drying step in a muffle furnace until it reaches a constant weight. The difference between the weight of the material when sampled and the weight of the material obtained after constant weight has been achieved at 500°C. drying temperature is presumed to be the water content of the zeolite. For example a 100 gram sample of a zeolite which has just been ion-exchanged is taken as a sample from a larger batch of zeolite which had just been dried in a given water content. The one hundred gram sample of material is then subjected to 500° drying temperatures for a period of time sufficient to allow that material to reach a constant weight. If the original 100 gram sample after the 500° drying step weighs approximately 96 grams, it is calculated that the percentage of water on a relative volatile free basis of the original adsorbent is 4 wt.%. In other words of the original material placed into the drying furnace at 500°C., 4 wt.% of that material had been driven off the zeolite in order to reach a constant weight state. This 4 wt.% material in this specification is presumed to be essentially all water. By using the above example to illustrate what is meant by a percentage of water on a sieve on a relative volatile free basis, the various percentage of water utilized in the adsorbent can be reproduced in the laboratory.

It can then be seen that the chemical composition of a zeolite adsorbent is measured without water being taken into consideration while the water content of an adsorbent on a relative volatile free basis is the percentage of water which can be driven off at 500°C. drying conditions.

Adsorbents which can be used in the process of this invention are generally referred to as crystalline aluminosilicates or molecular sieves and can comprise both the natural and synthetic aluminosilicates. Particular crystalline aluminosilicates encompassed by the present invention include aluminosilicate cage structures in which the alumina and silica tetrahedra are intimately connected in an open three dimensional network. The tetrahedra are cross-linked by the sharing of oxygen atoms with spaces between the tetrahedra occupied by water molecules prior to partial or total dehydration of this zeolite. The dehydration of the zeolite results in crystals interlaced with cells having molecular dimensions. Thus, the crystalline aluminosilicates are often referred to as molecular sieves when the separation which they effect is dependent essentially upon distinction between molecule sizes. In the process of this invention, however, the term molecular sieves is not suitable since the separation of isomers is dependent on electro-chemical attraction of different isomer configurations rather than pure physical size differences in the isomer molecules.

In hydrated form, the crystalline aluminosilicates generally encompass those zeolites represented by the formula in equation 1 below:

$$M_{2/n}O:Al_2O_3 \cdot w\ SiO_2 : y\ H_2O \quad (1)$$

where M is a cation which balances the electrovalence of the tetrahedra and is generally referred to as an exchangeable cationic site, $n$ represents the valence of the cation, $w$ represents the moles of $SiO_2$ and $y$ represents the moles of water. The cations may be any one of a number of cations which will hereinafter be described in detail.

The type X structured and type Y structured zeolites as used in this specification shall include crystalline aluminosilicates having a three dimensional interconnected cage structures and can specifically be defined by U.S. Pat. Nos. 2,882,244 and 3,130,007. The terms "type X structured" and "type Y structured" zeolites shall include all zeolites which have a general structure as represented in the above two cited patents and specifically including those structured containing various cations exchanged upon the zeolite. In the most limiting sense these terms refer to type X and type Y zeolites.

The type X structured zeolites can be represented in terms of mole oxides as represented by the formula in equation 2 below:

$$0.9 \pm 0.2 M_{2/n}O:Al_2O_3:2.5 \pm 0.5 SiO_2 \cdot y\ H_2O \quad (2)$$

where M represents at least one cation having a valence of not more than 3, $n$ represents the valence of M and $y$ is a value up to about 9 depending upon the identity of M and the degree of hydration of the crystalline structure.

The type Y structured zeolites can be represented in terms of the mole oxides for the sodium form as represented by the formula in equation 3 below:

$$0.9 \pm 0.2 Na_2O:Al_2O_3 \cdot aSiO_2 \cdot y\ H_2O \quad (3)$$

where $w$ is a value of greater than about 3 up to 8, and $y$ may be any value up to about 9.

Adsorbents contemplated herein include not only the sodium form of the type Y zeolite but also crystalline materials obtained from such a zeolite by partial or complete replacement of the sodium cation with other individual cations or groups of cations. Similarly, the type X zeolite also may be ion-exchanged.

Cationic or base exchange methods are generally known to those familiar with the field of crystalline aluminosilicate production. They are generally performed by contacting the zeolite with an aqueous solution of the soluble salts of the cation or cations desired to be placed upon the zeolite. The desired degree of exchange takes place before the sieves are removed from the aqueous solution, washed and dried to a desired water content. It is contemplated that cation exchange operations of the cation exchange may take place using individual solutions of desired cations placed on the zeolite or using an exchange solution containing a mixture of cations, where two or more desired to be placed on the zeolite.

The cations which may be placed upon the zeolite include cations selected from but not limited to the Group IA, Group IIA and Group IB metals. Specific cations which show a preferential selectivity for para-xylene with respect to ethylbenzene include lithium, sodium, potassium, rubidium, cesium, beryllium, magnesium, calcium, strontium, barium, silver, manganese, cadmium, and copper. These cations should be used in an adsorptive separation process in which para-xylene and ethylbenzene are desired to be separated. In instances where the above cations were used, para-xylene would be the preferentially adsorbed component of the feed mixture.

The following combination of cations shown to be particularly well suited for a para-xylene and ethylbenzene separation. These cations include potassium and barium, potassium and beryllium, potassium and manganese, rubidium and barium, cesium and barium, copper and cadmium, copper and silver, zinc and silver, and copper and potassium.

Cations which have shown a preferential selectivity of para-xylene with respect to meta-xylene and ortho-xylene include potassium, barium, sodium, silver along with the certain cation pairs including potassium and barium, potassium and beryllium, potassium and magnesium, potassium and rubidium, potassium and cesium, barium and rubidium, cesium and barium, and copper and potassium. Other cations are illustrated in Example II for separating other feed stock materials.

When singular cations are base exchanged upon a zeolite the singular cations can comprise anywhere from 5 up to 75 wt.% on a relative volatile free basis of the zeolite depending upon the molecular weight of the material exchanged upon the zeolite. It is contemplated that when single ions are placed upon the zeolite that they may be on the zeolite in concentrations of from about 1 percent to about 100 percent of the original cations present (generally sodium or calcium) upon the zeolite prior to its being ion-exchanged. By knowing the empirical formula including the silica to alumina ratio of the zeolite used, its water content and the type zeolite used whether it be a type X or type Y structured zeolite and the percentage of binder used if any, it is possible to calculate the percentage of ion exchange that has taken place.

When two or more than one cations placed upon the zeolite there are two parameters in which one can operate in order to effectively produce a zeolite having the maximum selective properties. One of the parameters is the extent of ion-exchange the zeolite which is determined by the length of time temperature and ion concentration. The other parameter is the ratio of individual cations placed on the zeolite. In instances in which the cation pairs comprise a group IIA metal and a group IA metal the weight ratio of these two components upon the zeolite can vary anywhere from about less than one up to about eighty depending upon the molecular weight of the Group IIA or Group IA metal. A particular useful zeolite is one which contains barium and potassium cations having a weight ratio of barium to potassium of from about 1 to about 40 and preferably in the range of about 1 to about 30. A ratio of from about 5 to about 25 is an especially preferred range. The cations when using Group IIA and Group IA metals can occupy from about 20 up to 100 percent of the ion exchangeable sites located upon the zeolite. In some instances, substantially all of the original cations placed on the zeolite are removed therefrom by the cations exchanged. Cations other than the Group IA or the Group IIA metals being placed on the zeolite in order that from about 10 to about 100 percent of original cations present within the zeolite are replaced by these metals.

In testing the various adsorbents two properties are found to be of particular importance in determining proper operating conditions to effect a reasonable separation of feed components. The two physical properties are the "selective pore volume" of the adsorbent and the "non-selective void volume" of the adsorbent. The term "selective pore volume" of the adsorbent is the volume of the adsorbent which selectively adsorbs extract components from the feed stock. This volume is also referred to as the selective adsorptive site volume. The term "non-selective void volume" of the adsorbent includes the cavities of the adsorbent which contain no selective adsorptive sites and the interstitial void spaces between the adsorbent particles. The non-selective void volume of the adsorbent offers no help in separating feed isomers and is considered as dead space within the adsorbent. The selective pore volume and the non-selective void volume are generally expressed in volumetric quantities and are of importance in determining proper flow rates of fluid required to contact the adsorbent for an efficient separation to take place.

BRIEF DESCRIPTION OF THE DRAWING

The attached drawing shows a graphical representation of the data which is described in the following example. On the abscissa is plotted the weight percent of water for an adsorbent based on a relative volatile free basis while on the ordinate scale is plotted the selectively as defined in equation 5 below.

The data plotted is in reality the selectivities of two different adsorbents at different water concentrations. The three plots shown by the solid lines are the selectivities reproduced for an essentially totally barium exchanged type X zeolite adsorbent. The broken lines represent the selectivities for a barium and potassium exchanged type X zeolite.

The squares represent the selectivities of the two adsorbents for para-xylene with respect to meta-xylene, the triangles represent the selectivities of para-xylene with respect to ortho-xylene, while the circles represent the selectivity of para-xylene with respect to ethylbenzene.

In general the two different adsorbents showed very similar relationships with respect to selectivity as a function of the water content on an adsorbent. For each of the different adsorbents tested the barium exchanged type X zeolite produced higher overall selectivities than the barium-potassium exchange zeolite at similar water contents.

As can be seen in the graphical representation the selectivity of para-xylene with respect to the other $C_8$ aromatic isomers reaches a maximum at some range of water concentration on the adsorbent. The maximum for the selectivity of para-xylene with respect to meta-xylene and orthoxylene xylene is about the same; somewhere around 2 to 3 weight percent water on a relative volatile free basis. However, the selectivity of para-xylene with respect to ethylbenzene, which in this case is the limiting selectivity, reaches a maximum at a slightly lower concentration of water; somewhere around 1.2 to about 2.0 weight percent water. Depending upon the percentage of the various $C_8$ aromatics present in the feed stock and the maximum selectivity desired, the water content can be varied anywhere from about 1 up to about 5. If ethylbenzene is absent the water concentration can vary even more; from less than 1 up to 8 or more weight percent. At the upper level of water concentrations, the selectivity may be sufficiently different from unity to theoretically allow a separation, but the adsorbent may contain so little adsorptive capacity because of the high water load that the process is not economic to operate.

The same results are expected for para-cymene with respect to the ortho-cymene, meta-cymene and isobutylbenzene isomers, for para-diethylbenzene with respect to ortho-diethylbenzene, meta-diethylbenzene and butylbenzene isomers, and for other feed stock isomers having para-, meta- and ortho-configurations along with a singly alkyl substituted isomer analogous to the ethylbenzene isomer.

EXAMPLE I

In this example two adsorbents containing varying water contents were tested in order to illustrate the necessity of selecting a proper concentration of water upon adsorbent in order to effectively utilize the enhancing selectivity obtained when water is placed on a barium containing zeolite.

In this example the feed stock was utilized which contained 5 volume percent each of ortho-xylene, meta-xylene, para-xylene, ethylbenzene and normal nonane, 19.2 vol.% para-diethylbenzene, 45.2 vol.% meta-diethylbenzene, 5.6 vol.% ortho-diethylbenzene, and 5 vol.% butylbenzenes. The feed stocks essentially are $C_8$ aromatic hydrocarbons diluted in a desorbent type material which comprise a mixed diethylbenzene isomer mixture. The normal nonane was placed in the feed stock to act as a tracer component which would indicate on a gas chromatographic analysis equipment when the feed stock is being eluded from the adsorbent by desorbent material.

The desorbent material utilized for all the testing procedures consists essentially of 100 vol.% mixed diethylbenzene procedure. Specifically, the desorbent contained 60.4 vol.% meta-diethylbenzene, 7.4 vol.% ortho-diethylbenzene, 25.6 vol.% para-diethylbenzene and 6.6 vol.% of butylbenzenes. This material was also utilized to dilute the feed stock.

The adsorbents utilized in this example consisted basically of two type X zeolites. One adsorbent consisted of essentially a totally barium exchange type X crystalline aluminosilicate. The composition of this zeolite was found to be about 40.1 wt.% silica, 29.4 wt.% alumina, 1.1 wt.% sodium oxide and about 29.4 wt.% barium oxide. This zeolite contained approximately 20 wt.% of the binder material which is made up of the clay type material comprising a mixture of silica and alumina. The other type of adsorbent utilized was a type X structured crystalline aluminosilicate which also contained roughly about 20 wt.% binder material but was ion exchanged with both barium and potassium cations. The approximate chemical composition of this zeolite is as follows: 41.0 wt.% silica, 29.2 wt.% alumina, 0.7 wt.% sodium oxide, 3.2 wt.% potassium oxide and about 25.6 wt.% barium oxide. Both of the adsorbents utilized in this example contained various quantities of water based on a relative volatile free basis. The water concentrations ranged from about 1/2 wt.% to about 7 wt.%. The water contents upon the adsorbents were arrived at by subjecting a large quantity of adsorbents to drying conditions taking a sample of the dried zeolite subjecting it to a 500° drying temperature until a constant weight was obtained and then measuring the weight difference between the dried product and the sample before it was dried. The volatile material driven off in this instance is assumed to be 100 percent water. By varying the drying conditions the water content of the zeolite could be varied.

The equipment used for this example consisted essentially of a 5-foot long coiled copper column having approximately 70 cc. of volume. The coil column was maintained within a heat-control medium in order to maintain the absorbent and products passing through it at a constant temperature of about 150°C. The coil contained inlet and outlet valves which were utilized to maintain sufficient pressure upon the coil to maintain liquid phase within the absorption column. The adsorption coil was filled with approximately 70 cc. of a selected adsorbent which was ground to a particle size averaging between about 14 to 40 mesh. The adsorption coil was connected to a gas chromatograph which was utilized to measure the effluent stream concentration at various time intervals to determine the relative concentrations of the various components being eluded from the column.

The general operating conditions included the passage of pure desorbent through the adsorption coil at a rate of about 1 liquid hourly space velocity until all of the adsorbent located within the coil had contacted desorbent material. At some convenient time interval the desorbent stream is stopped and a 10 minute pulse of feed is injected into the coil at one liquid hourly space velocity flow rate. After this 10 minute pulse has taken place the desorbent flow was then again resumed at one liquid hourly space velocity and continued until all of the feed aromatics are eluded from the coil. By constantly monitoring, through the use of the gas chromatograph, the varying composition of the effluent stream passing out of the adsorbent coil with respect to time it was possible to determine concentration profiles of feed stream components. Using the chromatographs generated it was possible using standard techniques to determine the selectivity of an adsorbent for the various $C_8$ isomers with respect to one another.

The sieves performance is rated in terms of the selectivity for para-xylene with respect to the other $C_8$ aromatics. The selectivity is defined as the ratio of the distances between the center of the para-xylene peak envelope and the $C_9$ tracer peak envelope to the corresponding distances for ethylbenzene, meta-xylene and ortho-xylene. I have found that through much experience utilizing this type of procedure to determine selectivity that a real selectivity can be determined for an adsorbent. The selectivity derived from this type of an experimental testing procedure is almost identical to the standard definition of selectivity shown in equation 5 below:

$$\text{Selectivity} = B_{x/y} = [(x/y)\ a]/[(x/y)\ b] \tag{5}$$

where the letters $x$ and $y$ represent the two individual components being tested for selectivity with respect to each other; subscripts $a$ and $b$ respectively refer to the adsorbed and unadsorbed phases.

Using the above testing procedure, there was developed reproducible data indicating the effects of water on promoting increased selectivity over a certain range of water contents for $C_8$ aromatic hydrocarbons. The results of this testing are shown in Table I below:

TABLE I

| Adsorbent Description | Wt. % Water on V.F. Basis* | Selectivity P/E | P/M | P/O |
|---|---|---|---|---|
| Ba type X | 0.5 | 1.98 | 2.29 | 1.81 |
| Ba type X | 2.4 | 2.13 | 3.70 | 3.40 |
| Ba type X | 3.6 | 1.77 | 3.63 | 3.37 |
| Ba type X | 5.5 | 1.66 | 3.06 | 2.94 |
| Ba type X | 7.1 | 1.54 | 2.38 | 2.38 |
| Ba-K type X | 0.6 | 1.69 | 2.45 | 2.60 |
| Ba-K type X | 1.9 | 1.71 | 2.87 | 2.69 |
| Ba-K type X | 2.4 | 1.57 | 3.67 | 3.13 |
| Ba-K type X | 3.5 | 1.50 | 3.68 | 3.26 |
| Ba-K type X | 5.5 | 1.45 | 3.16 | 2.99 |

* Wt.% water based on a relative volatile-free basis.

As can be seen from the data shown above there is a certain water content in which all of the selectivities of para-xylene with respect to ethylbenzene, meta-xylene, ortho-xylene show a maximum value.

EXAMPLE II

In this example, type X and type Y zeolites were exchanges with various cations to determine the selectivity of the adsorbents for para-isomers as compared to meta- and ortho-isomers of a bialkyl substituted aromatic hydrocarbon. The tests were performed on alkyl aromatics including diethylbenzenes, cymenes, and xylenes. The adsorbents contained essentially pure type X or type Y zeolite with the exception of the type X zeolite which contained a small portion of the binder material to hold it together. The adsorbents were approximately 20–40 mesh particle size.

The adsorbents which contained a single cation were essentially totally ion exchanged and generally contained less than about 2 wt.% residual sodium on a relative volatile free basis. The volatile free basis of less than 2 wt.% residual sodium on the adsorbent was measured after it had been subjected to 500° calcination temperatures to drive off most of the volatile material contained within the adsorbent. The adsorbents which contained two different cations were also totally ion-exchanged and contained less than about 2 wt.% residual sodium on a relative volatile free basis. The adsorbents containing two cations, contained approximately equal percentages of the cationic exchange sites in the zeolite occupied by the individual cations.

In determining the selectivities it has been found from previous experience when the mixture of para-, meta- and ortho-isomers are passed into a testing unit that the analysis procedure is complicated by the fact that three isomers are present. Consequently, in order to reduce the difficulty of analysis and determination of the selectivities the ortho-isomer was omitted from the feed stock. From previous experiments it has been found that the meta- and ortho- behave in substantially the same manner so that a sieve which selectively adsorbs a meta-isomer as compared to a para-isomer will in almost all instances also selectively adsorb the ortho-isomer as compared to para-isomer. The separation of meta- and ortho- isomers by adsorption is very difficult and for the purposes of our experiment was considered to be not feasible. The results of the experimental separation of para-isomers from meta-isomer are shown in Table II below:

TABLE II

| Zeolite Type | Cation(s) Present | Selectively Adsorbed Isomer(s) |
|---|---|---|
| Y | K | Para |
| Y | Rb | Para |
| Y | Cs | Para |
| Y | Ag | Para |
| Y | Ba | Para |
| X | Na | Para |
| Y | Li | Meta and Ortho |
| Y | Na | Meta and Ortho |
| Y | Be | Meta and Ortho |
| Y | Mg | Meta and Ortho |
| Y | Ca | Meta and Ortho |
| Y | Sr | Meta and Ortho |
| Y | Mn | Meta and Ortho |
| Y | Cd | Meta and ortho |
| Y | Cu | Meta and Ortho |
| Y | K, Ba | Para |
| Y | K, Be | Para |
| Y | K, Mg | Para |
| Y | K, Rb | Para |
| Y | K, Cs | Para |
| Y | Rb, Ba | Para |
| Y | Cs, Ba | Para |
| X | K, Ba | Para |
| Y | K, Cu | Para |
| Y | Cu, Cd | Meta and Ortho |
| Y | Cu, Ag | Meta and ortho |
| Y | Zn, Ag | Meta and Ortho |

As can be seen above, various cations allow the para-isomer to be selectively adsorbed over them meta and ortho isomers while in other instances the meta and ortho isomers are selectively adsorbed as compared to the para-isomer.

I claim as my invention:

1. In an improved process for separating aromatic hydrocarbons from a feed containing a mixture of aromatic isomers including para-isomers, which process comprises contacting, at adsorption conditions, said feed with a crystalline aluminosilicate adsorbent selected from the group consisting of type X structured or type Y structured zeolites containing barium cations at the base exchangeable sites within the zeolite, to effect the selective adsorption of said para-isomer by said adsorbent, wherein the improvement comprises utilizing a zeolite containing water in the range of from about 1 to about 5 weight percent of the zeolite as measured on a relative volatile free basis.

2. The process of claim 1 further restricted in that said feed is selected from the group consisting of $C_8$ aromatic isomers, $C_9$ aromatic isomers, $C_{10}$ aromatic isomers and $C_{11}$ aromatic isomers.

3. The process of claim 1 further restricted in that said zeolite contains barium cations at over about 75 percent of the base exchangeable sites within the zeolite.

4. The process of claim 1 further restricted in that said zeolite contains water in the range of from about 1 to about 3 weight percent of the zeolite as measured on a relative volatile free basis.

5. The process of claim 1 further restricted in that said zeolite contains barium cations at over about 75 percent of the base exchangeable sites and water in the range of from about 1 to about 3 weight percent of the zeolite as measured on a relative volatile free basis.

6. The process of claim 2 further restricted in that said $C_8$ aromatic feed isomers are xylene isomers and ethylbenzene.

7. The process of claim 2 further restricted in that said $C_{10}$ aromatic feed isomers are diethylbenzene isomers.

8. The process of claim 2 further restricted in that said $C_{11}$ aromatic feed isomers are cymene isomers.

* * * * *